United States Patent

Matsumoto et al.

[11] Patent Number: 6,078,375
[45] Date of Patent: Jun. 20, 2000

[54] LIQUID CRYSTAL DISPLAY DEVICE WITH WIDE VIEWING ANGLE

[75] Inventors: Kimikazu Matsumoto; Eriko Fujimaki, both of Tokyo, Japan

[73] Assignee: NEC Corporation, Tokyo, Japan

[21] Appl. No.: 09/154,039

[22] Filed: Sep. 16, 1998

[30] Foreign Application Priority Data

Sep. 17, 1997 [JP] Japan ................................. 9-252060

[51] Int. Cl.[7] ................................................. G02F 1/1337
[52] U.S. Cl. ............................................. 349/123; 349/141
[58] Field of Search .................................. 349/141, 126, 349/128

[56] References Cited

U.S. PATENT DOCUMENTS 5,905,556  5/1999  Suzuki et al. ............................ 349/141
5,986,735  11/1999  Komatsu ................................. 349/128

FOREIGN PATENT DOCUMENTS

9-80436  3/1997  Japan.
9-230364  9/1997  Japan.

Primary Examiner—James A. Dudek
Attorney, Agent, or Firm—Sughrue, Mion, Zinn, Macpeak & Seas, PLLC

[57] ABSTRACT

In an LCD device of an IPS (In-Plane Switching) mode having two alignment films which are subjected to individual aligning treatments and between which liquid crystal molecules are interposed and sealed, the aligning treatments of the two alignment films are carried out in the same directional orientation to put the molecules into a state of splay alignment. Specifically, parts of the molecules adjacent to the two alignment films have pretilt angles each of which has an absolute value not smaller than two degrees due to influence of the aligning treatments. Therefore, an appearance of undesirable light points is suppressed in the manufacturing the LCD device, and the LCD device has a good yield.

10 Claims, 8 Drawing Sheets

LIQUID CRYSTAL DISPLAY DEVICE WITH WIDE VIEWING ANGLE

BACKGROUND OF THE INVENTION

This invention relates to a liquid crystal display (will be abbreviated to an LCD hereinafter) device with wide viewing angle and, in particular, to a method of subjecting alignment films included in the LCD device to an aligning treatment.

In general, LCD devices have various advantages that they are thin in thickness and low in power consumption, and so on, in comparison with CRT (cathode ray tube) display devices. Therefore, such LCD devices might be expected to be substituted for CRT display devices and have been a matter of great interest in some industry fields.

However, LCD devices are disadvantageous in that a viewing angle is narrow as compared with the CRT display devices. Taking this into consideration, various schemes have been devised to widen the viewing angle of the LCD devices.

As one of recent schemes, proposal has been made about an In-Plain Switching mode (IPS) of an LCD device so as to widen the viewing angle of LCD devices. It is to be noted that such an LCD of an IPS type is based on a principle different from ones of other types, such as Twisted Nematic (TN) mode, Super Twisted Nematic (STN) mode, and the like, that will be collectively referred to as a usual LCD device. In this connection, the LCD device of the IPS type will be called a new LCD device.

With regard to the usual LCD device, it is known that an electric field is vertically impressed relative to a principal surface defined by a substrate. When such an electric field is selectively and locally impressed on a liquid crystal layer, liquid crystal molecules in the liquid crystal layer are vertically aligned or oriented relative to the principal surface. Coexistence of aligned liquid crystal molecules with normal liquid crystal molecules brings about contrast between black and white on the usual LCD device.

On the other hand, the new LCD brings about the contrast by horizontally and locally impressing an electric field parallel to a principal surface. In this case, the liquid crystal molecules of the liquid crystal layer are locally aligned or oriented along the parallel electric field. More specifically, each liquid crystal molecule represented by an oval shape model is rotated in a plane due to the parallel field. This results in rotation of an orientation vector of each liquid crystal molecule defined by a long axis of each molecule. Herein, the orientation vectors of the molecules are termed directors. At any rate, it is known in the art that the new LCD device can decrease dependency of the viewing angle, as compared with the usual LCD device. Specifically, such dependency of the viewing angle is representative of a relationship between the viewing angle and the contrast.

As one of the new LCD device, an LCD device is disclosed in Japanese Unexamined Patent Publication No. Hei 9-80436, namely, JP-A 9-80436 and will be called a conventional LCD device. The conventional LCD device has a first substrate with a first principal surface and a second substrates with a second principal surface opposite to the first principal surface. On the first substrate, first and second electrodes are deposited which have particular shapes like combs and which are alternately arranged with each other in an interleaved manner. The conventional LCD device, furthermore, has a liquid crystal layer formed by a plurality of molecules which are interposed and sealed between the first and second substrates. Specifically, splay alignment must be carried out such that pretilt angles of the liquid crystal molecules fall within a range between 0 and 1.5 degrees, both inclusive, in the conventional LCD device. The conventional LCD device of such structure should theoretically exhibit a wide viewing angle and a high contrast.

However, the above-mentioned LCD device cannot practically accomplish a good yield in a conventional production process. When the conventional LCD device is designed and manufactured in accordance with the conventional technique, undesirable light points partially appears on the conventional LCD and result in occurrence of an inferior article. Therefore, the yield becomes low. This makes the cost of the LCD device high. Such a conventional LCD device of a high cost is undesirable in the consumer market, even if regular or normal products have wide viewing angles.

SUMMARY OF THE INVENTION

It is therefore an object of the present invention to provide an LCD device of an IPS type, which can be manufactured at a high yield.

It is another object of the present invention to provide an LCD device of the type described, which is wide in viewing angle.

Other objects of this invention will become clear as the description proceeds.

In order to resolve the above-mentioned problems of the conventional LCD device, research has been directed to a factor making partial light points. As a result of the research, it has been found out that such light points frequently appear when pretilt angles of molecules are small. Theoretically, an LCD device of the IPS type is not concerned with pretilt angles of molecules because its principle of performance is based on in-plain switching operation. Practically, experiments have taught that such light points much very often appear on the panel with the pretilt angles kept at small angles and, on the other hand, the viewing angles are narrow with an increase of the pretilt angles. Under the circumstances, a preferable pretilt angle range is determined in relation to occurrence of partial light points and a wide viewing angle. In other words, the occurrence of the light points can be reduced within the preferable pretilt angle range with a viewing angle kept wide. As a result, it has been found out that the preferable pretilt angle range is between three degrees and eight degrees, both inclusive.

This invention provides an LCD device based on the above-mentioned research so as to solve the above-mentioned problems and will be described in detail hereinafter.

According to the present invention, a new liquid crystal display device, namely an LCD device of the IPS type, comprises a first substrate with a first principal surface, a first alignment film formed on the first principal surface, a second substrate with a second principal surface, a second alignment film formed on the second principal surface, and a liquid crystal layer formed by a plurality of liquid crystal molecules.

The first alignment film is subjected to a first aligning treatment while the second alignment film is subjected to a second aligning treatment in the same directional orientation as the first aligning treatment. Besides that, the first and second alignment films are oppositely disposed each other with a predetermined space left between them.

The plurality of liquid crystal molecules are interposed and sealed between the first and the second alignment films.

Specially, a part of the molecules which is adjacent to the first alignment film has a first pretilt angle. The first pretilt angle falls within a first predetermined range which is not smaller than two degrees from the first alignment film due to the influence of the first aligning treatment. On the other hand, the other part of the molecules which is adjacent to the second alignment film has a second pretilt angle. The second pretilt angle falls within a second predetermined range which is not smaller than two degrees from the second alignment film due to the influence of the second aligning treatment.

Furthermore, the first substrate has two electrodes which are for generating a electric field which is substantially parallel to the first principal surface (also parallel to the second principal surface) in the predetermined space in order to rotate the molecules in accordance with the electric field.

In the above structure, it is desirable that the first and the second predetermined ranges are not smaller than three degrees from the first and the second alignment films, respectively, and is further desirable that the first and the second predetermined ranges are not greater than ten degrees from the first and the second alignment films, respectively. More preferably, each of the first and the second predetermined ranges is between three degrees and eight degrees, both inclusive, respectively.

DESCRIPTION OF THE PREFERRED EMBODIMENTS

An LCD device according to the preferred embodiment of this invention has a plurality of pixels and can display a color image on a panel as an aggregate of the pixels. It is assumed that the panel has a top, a bottom, and sides between the top and the bottom and that vertical and horizontal directions are defined between the top and the bottom of the panel and between the sides of the panel. Especially, the LCD device has thin film transistors (TFT) as switching elements for the respective pixels and is of the IPS type. Herein, such LCD devices of the IPS type is also called Super TFT color LCD devices in the consumer market.

Figure 1:
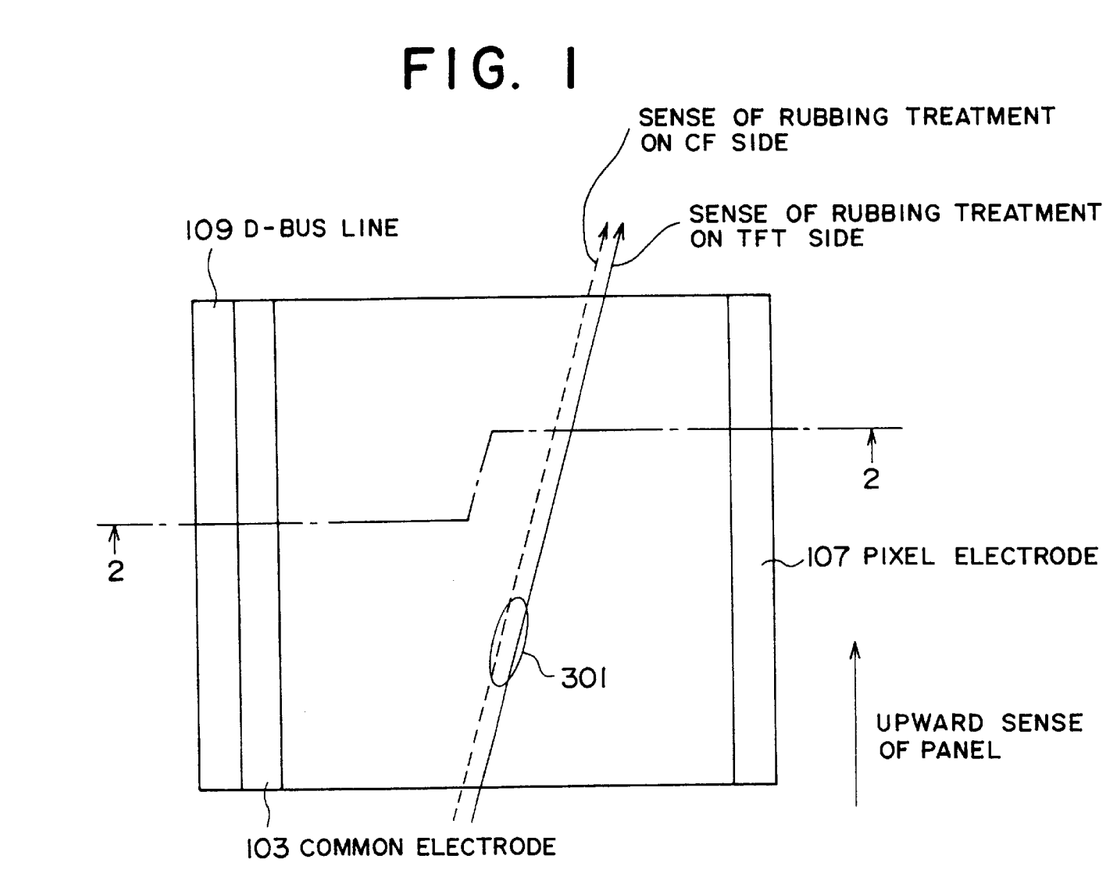
FIG. 1 shows a plane view of a liquid crystal display device according to an embodiment of the present invention.
Figure 2:
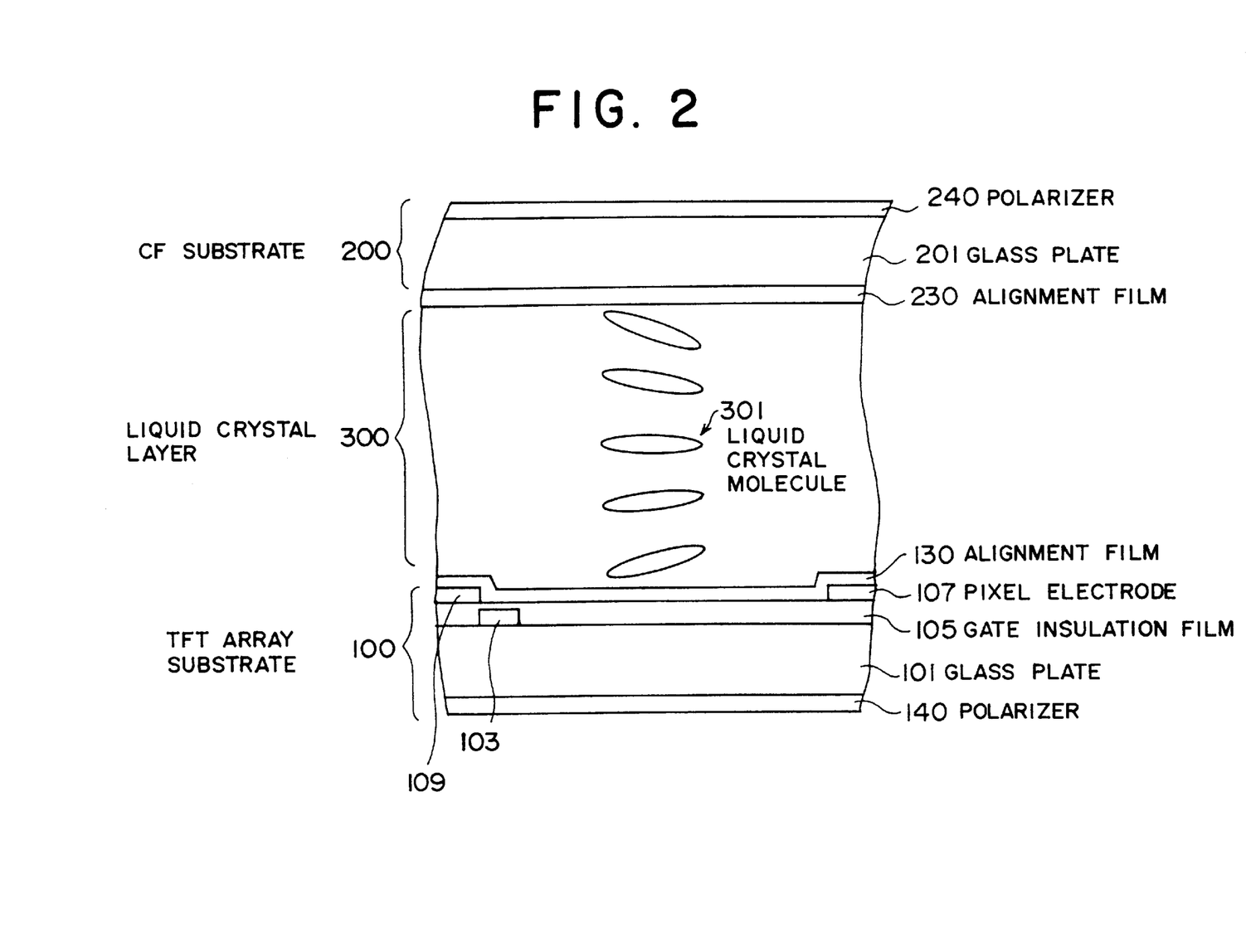
FIG. 2 shows a cross-sectional view taken substantially along the lines 2—2 of FIG. 1.

Referring to FIGS. 1 and 2, the LCD device according to this embodiment has a TFT array substrate 100, an alignment film 130 formed on the TFT array substrate 100, a color filter (CF) substrate 200, an alignment film 230 formed on the CF substrate 200, and a liquid crystal layer 300 located between two alignment films 120 and 230.

In detail, the TFT array substrate 100 has a glass plate 101, a common electrode 103, a gate insulation film 105, a pixel electrode 107 and a drain bus line (D-bus line) 109. The D-bus line 109 is also called a picture signal line to transmit a picture signal of an image displayed on the panel. The common electrode 103, the gate insulation film 105, the pixel electrode 107 and the D-bus line 109 are all formed on one side of the glass plate 101. Especially, the common electrode 103, the pixel electrode 107 and the D-bus line 109 all have parts arranged in the vertical direction which is specified in FIG. 1 by an arrow of an upward direction directed from the bottom of the panel to the top thereof. Furthermore, the alignment film 130 covers all over the common electrode 103, the gate insulation film 105 and the pixel electrode 107. A surface of the TFT array substrate 100, on which the alignment film 130 is formed, is referred to as a first principal surface. On the other side of the glass plate 101, opposite to the first principal surface, a polarizer 140 is formed.

On the other hand, the CF substrate 200 has a glass plate 201 as a main component. The alignment film 230 is formed on a side of the glass plate 201, which is referred to as a second principal surface. On the other side of the glass plate 201, opposite to the second principal surface, a polarizer 240 is formed.

The liquid crystal layer 300 is formed by a plurality of liquid crystal molecules 301 which are interposed and sealed between two alignment film 130 and 230. Specifically, the molecules 301 are aligned in a way of splay alignment.

Figure 3:
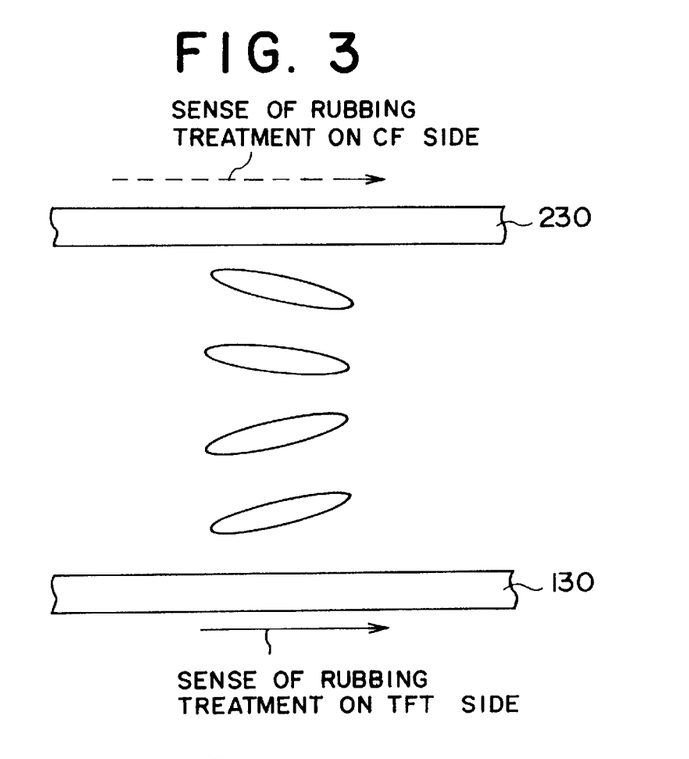
FIG. 3 is a side sectional view for use in describing of a method of aligning treatment which cause splay alignment.

As shown in FIG. 3, the splay alignment of the molecules 301 is done by subjecting two alignment films 130 and 230 to first and second aligning treatments, respectively. In this embodiment, rubbing treatments are used as both of first and second aligning treatments. Herein, a directional orientation of rubbing treatment for the alignment film 130 is depicted by a solid line with an arrow while a directional orientation of rubbing treatment for the alignment film 230 is depicted by a broken line with an arrow, in FIG. 3. Similar arrows and lines will be also used in the other figures, as will become clear later.

Moreover, the directional orientation of rubbing treatment for the alignment film 130 on a TFT side is the same as the directional orientation of rubbing treatment for the alignment film 230 on a CF side. Each of the directional orientation of the rubbing treatments for the alignment films 130 and 230 is determined on each alignment film. When the alignment film 130 is subjected to the rubbing treatment in the above-mentioned manner, a part of molecules adjacent to the alignment film 130 is horizontally aligned in the directional orientation of rubbing treatment. In addition, each director of the part of the molecules is vertically tilted at a first pretilt angle between the director and the sense of rubbing treatment of the alignment film 130 . On the other hand, when the alignment film 230 is subjected to the rubbing treatment in the above-mentioned manner, the other part of molecules adjacent to the alignment film 230 is also horizontally aligned in the directional orientation of rubbing treatment. In addition, each director of the other part of molecules is tilted at a second pretilt angle between the director and the directional orientation of rubbing treatment of the alignment film 230.

Thus, the splay alignment is realized on the condition that two rubbing treatments for the alignment films 130 and 230 are executed in the same directional orientation.

It is to be noted that this invention briefly has a feature that the first and second pretilt angles falls within first and second predetermined ranges, respectively, each of which is not smaller than two degrees.

Figure 4:
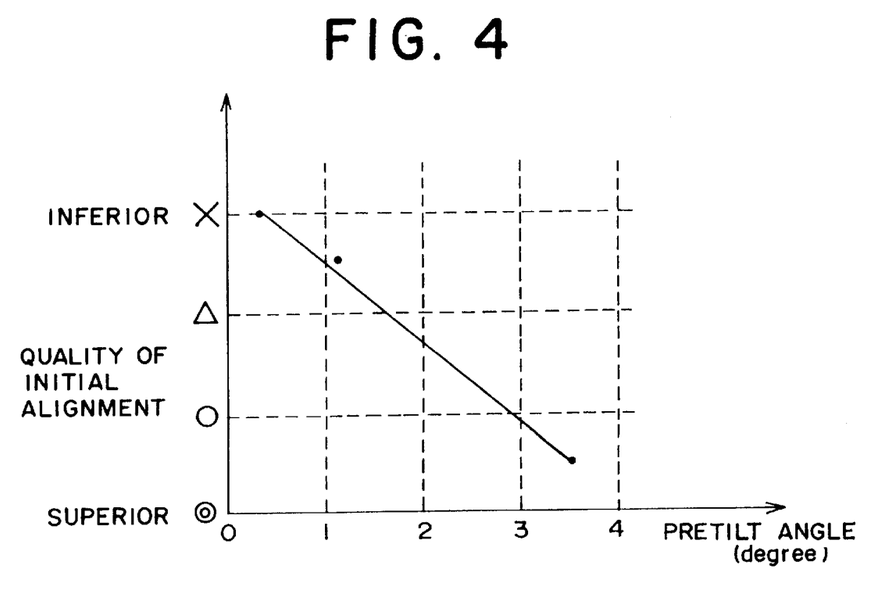
FIG. 4 shows a relationship between a pretilt angle and quality of initial alignment.

Referring to FIG. 4, a relationship between a pretilt angle and a quality of initial alignment shows the fact that the closer a pretilt angle is zero, the more undesirable light points take place. In FIG. 4, a triangle mark represents a low but an acceptable quality unless the level of the triangle mark is exceeded. To avoid occurrence of inferior articles, both of the first and second predetermined ranges must not be smaller than two degrees, as readily understood from FIG. 4. In FIG. 4, a circle mark represents a good quality. Accordingly, both of the ranges are not desirably smaller than three degrees.

Furthermore, in order for the LCD device to have a good characteristic of the viewing angle, consideration should be made about the viewing angles over all azimuthal angles and the contrast of the LCD device. Specifically, it is preferable that the contrast is not lower than ten when the viewing angles over all azimuthal angles take seventy degrees.

Under this circumstance, it has been found out that both of the first and second predetermined ranges of the first and the second pretilt angles must not be greater than ten degrees. More preferably, the inventors' experimental studies have taught that both of the ranges are not greater than eight degrees.

Consequently, as the most preferable ranges, both of the first and second predetermined ranges are selected between three degrees and eight degrees, both inclusive.

Figure 5:
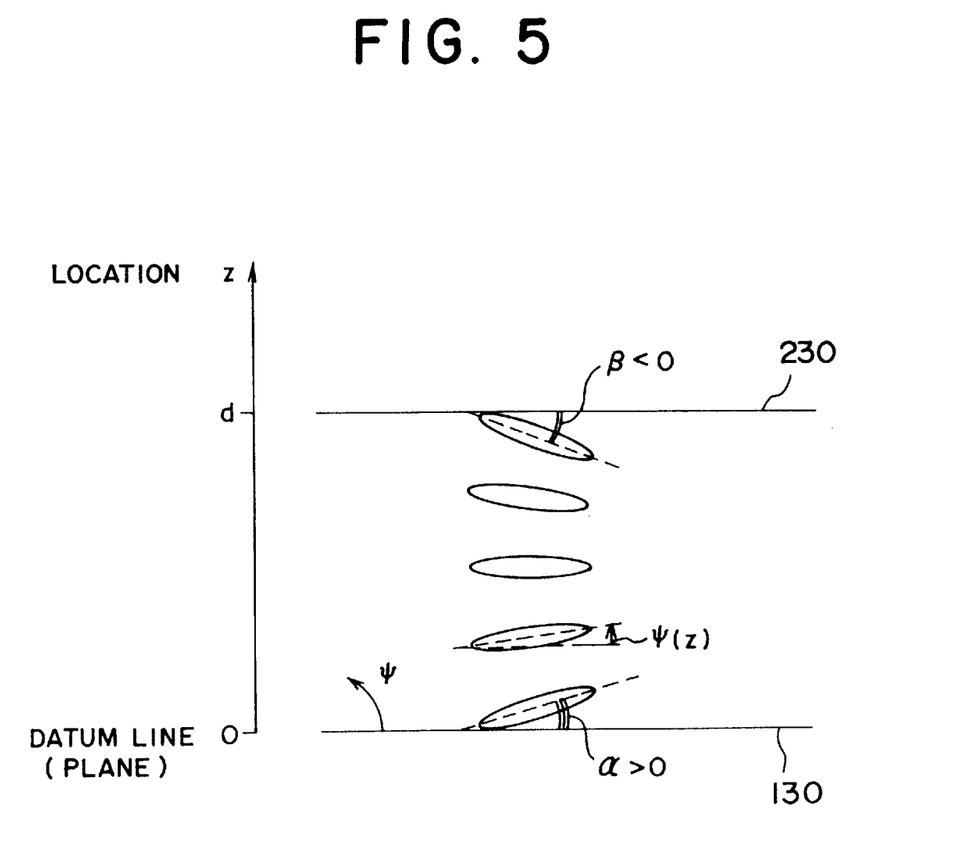
FIG. 5 is a side sectional view for use in describing of a relationship between a tilt angle $\Psi$ (z) and a location z.

In this splay alignment, each molecule has a particular tilt angle in correspondence with a location in case that the alignment film 130 is regarded as a reference or datum plane illustrated in the form of a datum line in FIG. 5. Therefore, a retardation (which is a known factor in the art and which will be described later) of this alignment differs from one of a uniform alignment that the directors of molecules are oriented in the same direction. This retardation of splay alignment is referred to as an effective retardation $R_{eff}$ which is distinct from a retardation of the uniform alignment.

Under the circumstances, another feature of this invention is that the effective retardation $R_{eff}$ falls within a range represented by Equation (1).

$$0.2 \mu m < R_{eff} < 0.36 \mu m \qquad (1)$$

Detail explanation about the effective retardation will be made later with reference to equations and FIG. 5.

As shown in FIG. 5, let the alignment film 130 be deposited on TFT side to form a reference or datum plane, and let a location of each molecule be represented by a location z along a thickness direction of the liquid crystal layer 300. In this connection, the location z takes a positive value from the alignment film 130 toward the alignment film 230 of CF side in a vertical direction for the TFT array substrate 100, and takes a maximum value d at the location of the alignment film 230 deposited on the CF side. As a result, it is readily understood that z is variable between 0 and d.

Herein, consideration is made about a first pretilt angle α (>0 degree) of a molecule adjacent to the alignment film 130 and a second pretilt angle β (<0 degree) of a molecule adjacent to the alignment film 230. In this event, the first and the second pretilt angles α and β are represented by Equations (2) and (3), respectively.

$$\Psi(0) = \alpha \qquad (2)$$

$$\Psi(d) = \beta \qquad (3)$$

And, besides that, a particular tilt angle of a molecule located at the variable location z is represented by Equation (4).

$$\psi(z) = \frac{z}{d}\beta + \frac{d-z}{d}\alpha \qquad (4)$$

As understood from the above Equation (4), the tilt angle Ψ (z) has a unique value determined by the variable location z.

Thus, consideration is also made about a refraction anisotropy and the tilt angle Ψ (z) mentioned above. In this event, it is to be noted that a refraction anisotropy at one location differs from the other refraction anisotropy at the other location. Therefore, in this specification, a concept of an effective refraction anisotropy Δn' is introduced when a refraction anisotropy is variable with the variable location z. The effective refraction anisotropy Δn' is represented by Equation (5) in connection with the pretilt angle of the molecule at the variable location z and both refractive indexes $n_e$ and $n_o$ of long and short axes of the molecule.

$$\Delta n'(z) = \frac{n_e n_o}{\sqrt{n_e^2 \sin\psi(z) + n_o^2 \cos\psi(z)}} - n_0 \qquad (5)$$

As described before, an effective retardation $R_{eff}$ is used instead of general retardation Δnd in this specification. The effective retardation $R_{eff}$ is defined by integrating Δn' (z) with respect to z from 0 to d. That is, the effective retardation $R_{eff}$ is represented by Equation (6).

$$R_{eff} = \int_0^d \Delta n'(z) \cdot dz \qquad (6)$$

By the way, in the LCD device of the IPS type, the light transmittance $T/T_0$ is generally represented by Equation (7).

$$\frac{T}{T_0} = \sin^2(2\delta)\sin^2(\pi \Delta nd / \lambda) \qquad (7)$$

where λ represents a wavelength of light transparent into the liquid crystal layer, Δnd represents a general retardation, and δ represents an angle between the director of each molecule and the poralizer absorption axis. In this invention, the above general retardation Δnd is replaced by the effective retardation $R_{eff}$.

Substitution of 550 nm for the wavelength λ in Equation (7) replaced as mentioned above gives 0.275 μm as the effective retardation $R_{eff}$. Further, a wavelength range between 400~720 nm may be considered as a range of a visible ray. In this case, the range shown in the above Equation (1) is given as the effective retardation $R_{eff}$.

Now, detail explanation will be made about the concept of this invention with first and second examples.

Figure 6:
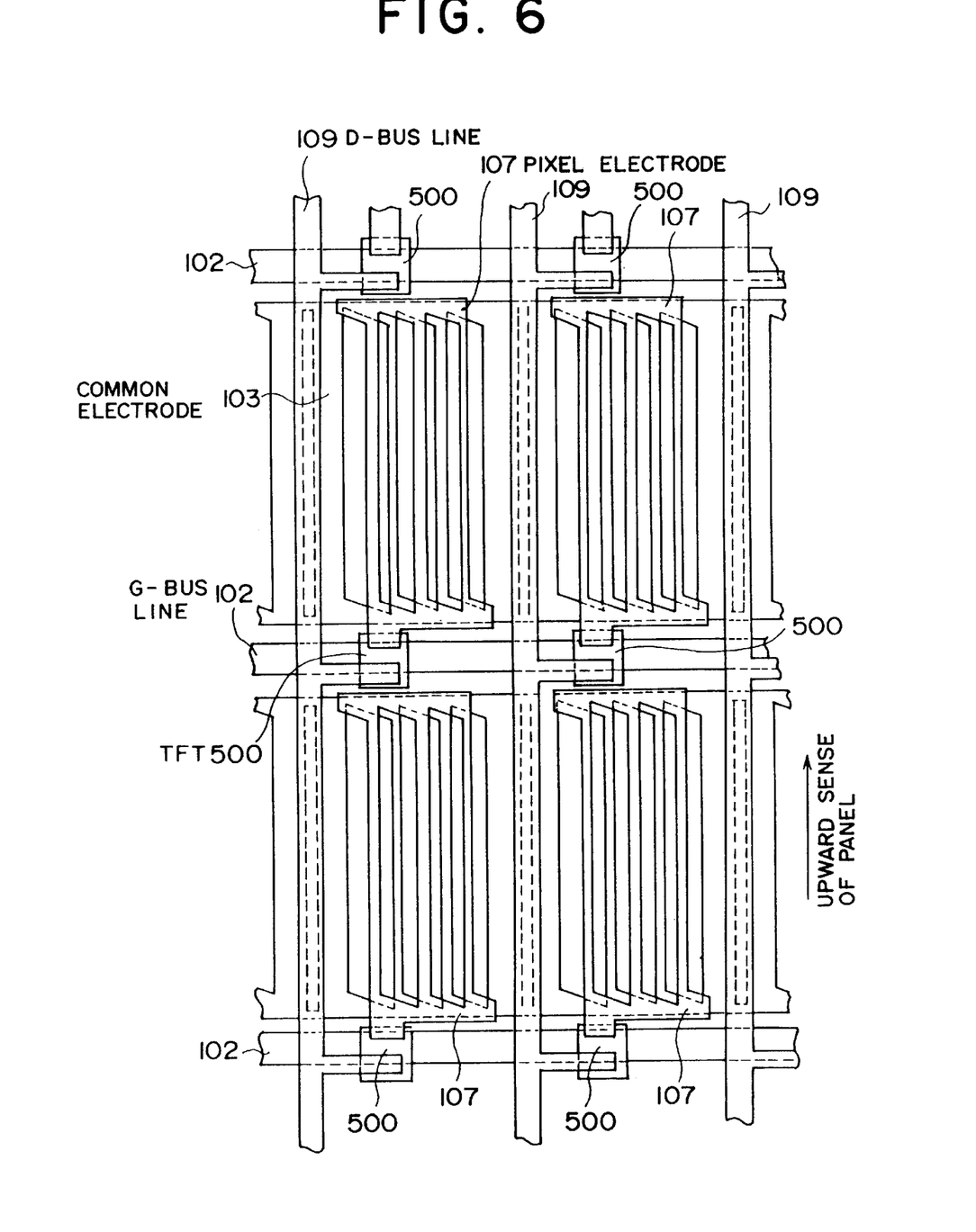
FIG. 6 is a front view for use in describing of electrodes structure in a liquid crystal display device according to a first example of this invention, which has a plurality of pixels aligned in a matrix or array fashion.
Figure 7:
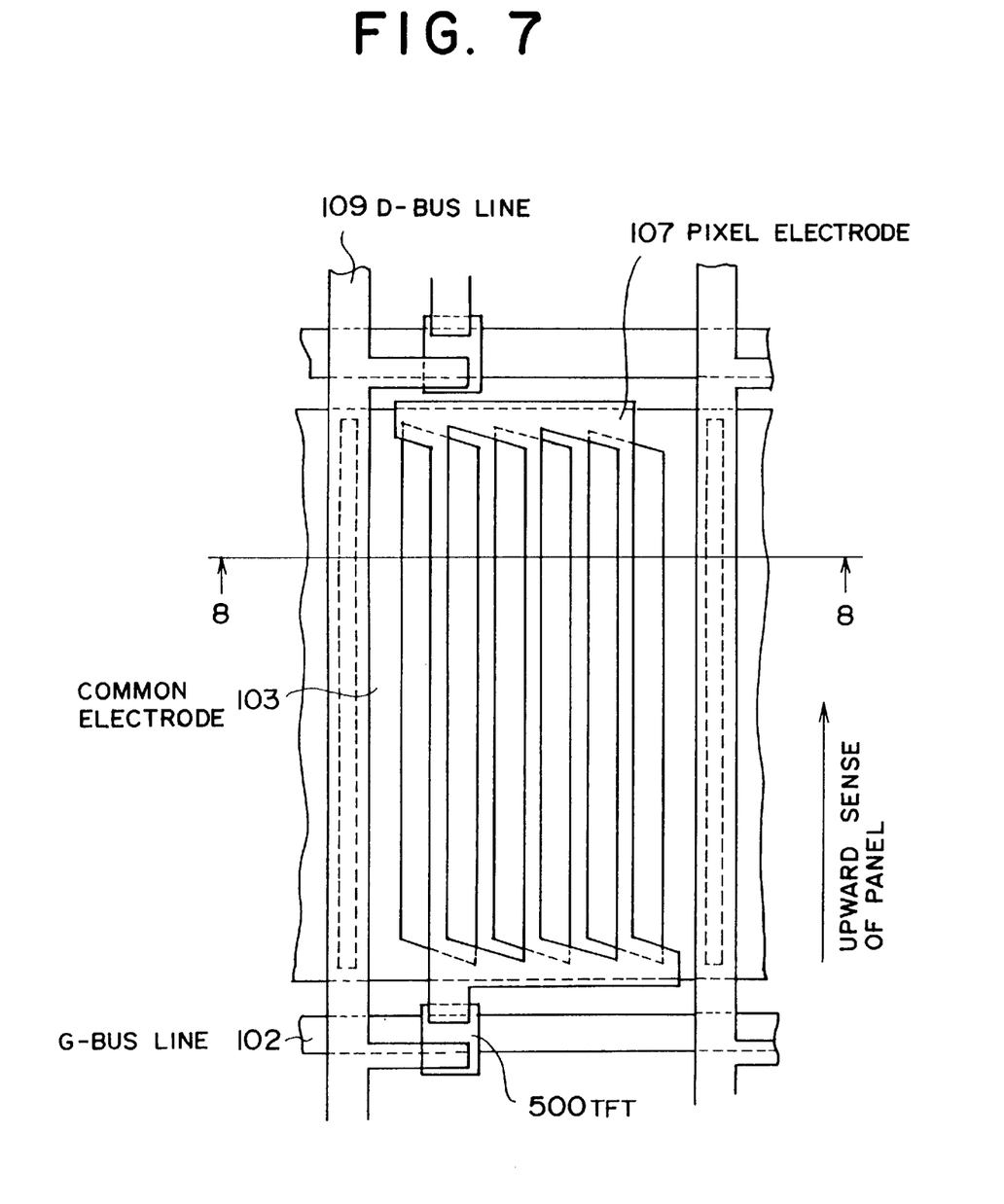
FIG. 7 is a front view showing structure of a part corresponding to one pixel in the liquid crystal display device illustrated in FIG. 6.
Figure 8:
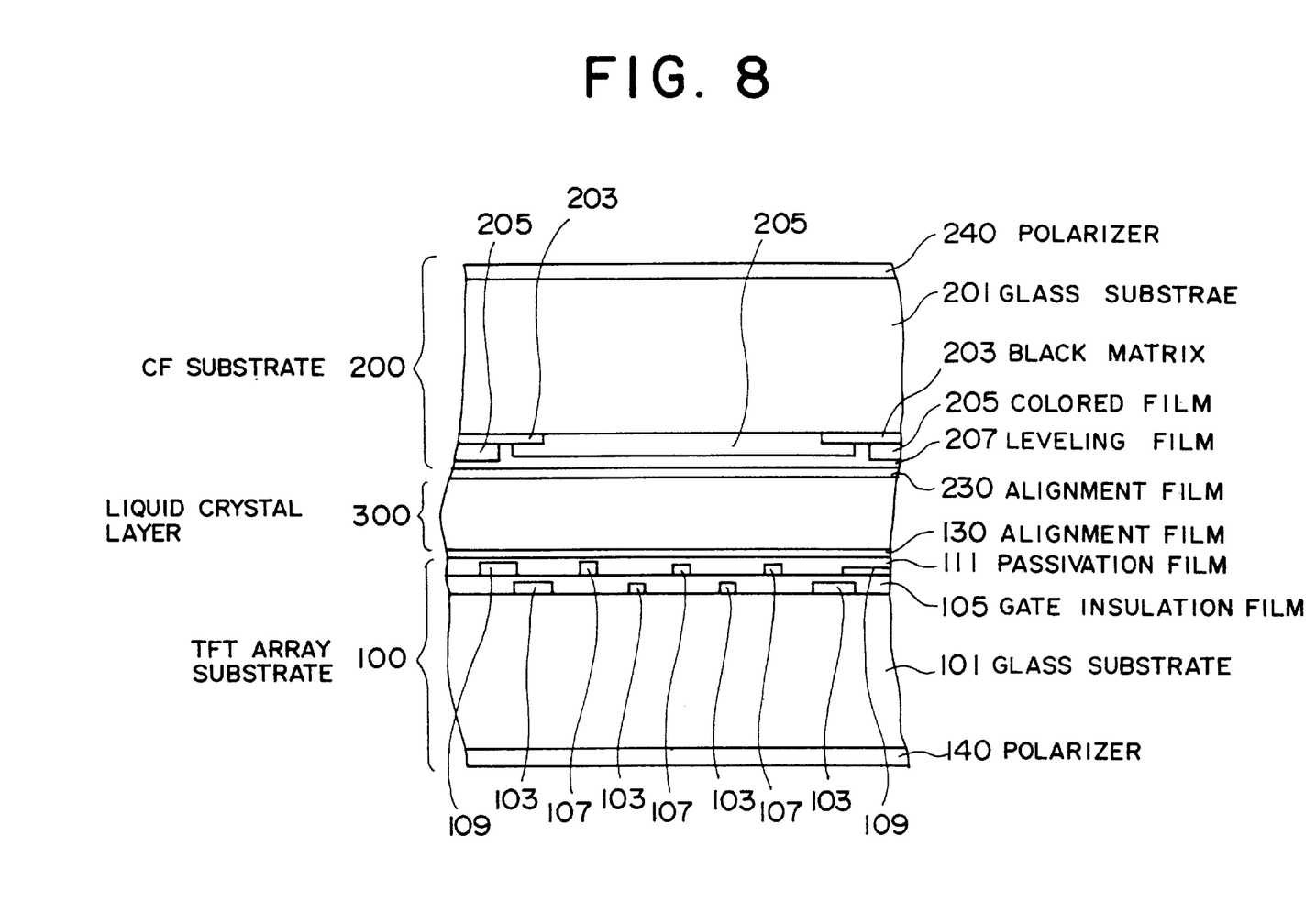
FIG. 8 is a side sectional view taken substantially along the lines 8—8 of FIG. 7.

Referring to FIGS. 6, 7, and 8, the LCD device of the first example has a plurality of pixels aligned in a matrix or array fashion. In detail, the LCD device of the first example has a plurality of gate bus lines (G-bus lines) 102 laid along a right-and-left direction of the panel, a plurality of D-bus lines 109 laid along a up-and-down direction of the panel, a common electrode 103 supplied with a referential voltage, TFTs 500 each of which is arranged for each pixel, and pixel electrodes each of which is also arranged for each pixel. Herein, each G-bus line 102 is also called a scanning signal line to transmit a scanning signal for pixels.

Each of the G-bus lines 102 is connected to gate electrodes of the TFTs 500 included in each row corresponding to each G-bus line. Each of the D-bus lines 109 is connected to drain electrodes of the TFTs 500 included in each column corresponding to each D-bus line. Each of the pixel electrodes 107 is connected to a source electrode of each TFT 500 corresponding to each pixel electrode 107 as shown in FIG. 7.

As shown in FIG. 8, the illustrated device has a TFT array substrate 100, an alignment film 130 formed on the TFT array substrate 100, a color filter (CF) substrate 200, an alignment film 230 formed on the CF substrate 200, and a liquid crystal layer 300 located between two alignment films 120 and 230.

In detail, the TFT array substrate 100 has a glass plate 101, a common electrode 103, a gate insulation film 105, a pixel electrode 107, a D-bus line 109, and a passivation film 111. The common electrode 103, the gate insulation film 105, the pixel electrode 107 and the D-bus line 109 are all formed on one side of the glass plate 101. Furthermore, the passivation film 111 covers all over the gate insulation film 105, the pixel electrode 107 and the D-bus line 109. Especially, the common electrode 103, the pixel electrode 107, and the D-bus line 109 all have parts extended in the upward direction of the panel. Besides, the alignment film 130 covers all over the passivation film 111. A surface of the TFT array substrate 100, on which the alignment film 130 is formed, is referred to as a first principal surface. On the other side of the glass plate 101, opposite to the first principal surface, a polarizer 140 is formed.

On the other hand, the CF substrate 200 has a glass plate 201, black matrices 203, colored films 205, and a leveling film 207. The black matrices 203 and the colored films 205 are all formed on one side of the glass plate 201 and are all covered by a leveling film 207. In addition, the alignment film 230 is formed on a leveling film 207. On the other side of the glass plate 201, opposite to the one side, a polarizer 240 is formed.

The liquid crystal layer 300 includes a plurality of liquid crystal molecules which are interposed and sealed between two alignment film 130 and 230. Specifically, the molecules are aligned in a way of splay alignment because a directional orientation of rubbing treatment for the alignment film 130 is the same as the directional orientation of rubbing treatment for the alignment film 230 . Herein, an angle between the upward directional orientation of the-panel and the directional orientation of rubbing treatment for the alignment film 130 is referred to as an alignment angle $\phi_{TFT}$ on the TFT side. On the other hand, another angle between the upward direction of the panel and the directional orientation of rubbing treatment for the alignment film 230 is referred to as an alignment angle $\phi_{CF}$ on the CF side.

With this structure, when a certain one of the G-bus lines 102 is provided with scanning signal, TFTs connected to the G-bus line are turned on, and the turned-on TFTs introduce picture signals transmitted on the D-bus lines 109 into the pixel electrodes 107, respectively. In consequence, the picture signal is introduced into each pixel electrode 107 connected to each turned-on TFT to generate an electric field between the common electrode 103 and each of the pixel electrodes 107.

This electric field is generated in a right-and-left direction or the horizontal direction of the panel of the LCD device and rotates the directors of molecules included in the liquid crystal layer 300 in a plane parallel to the surface of TFT array substrate 100. Thus, an image is displayed through the polarizer 140 or 240.

Figure 9:
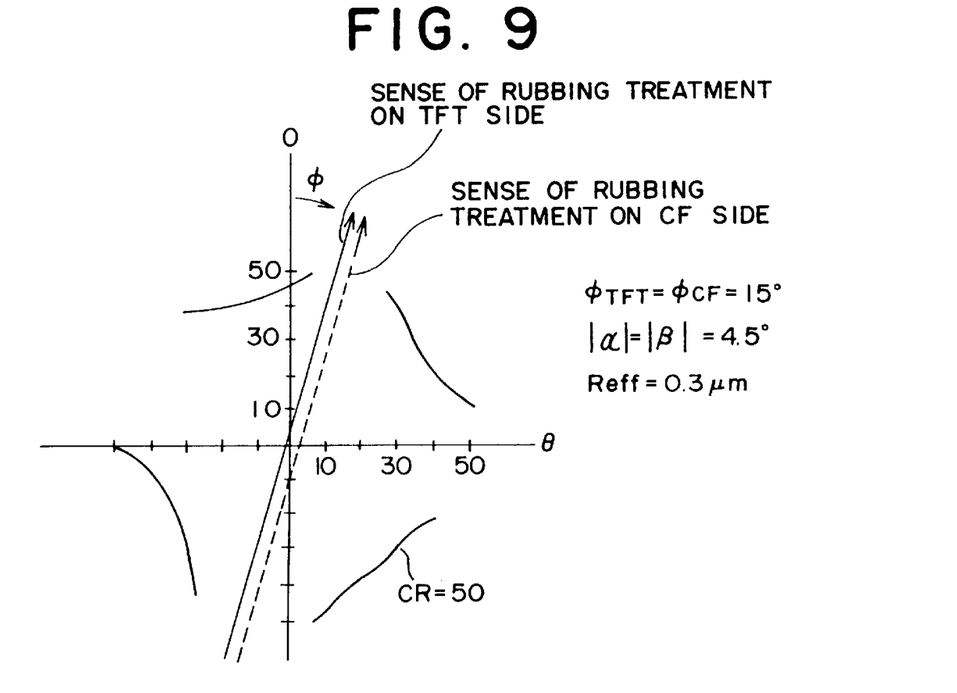
FIG. 9 is a view for use in describing a characteristic of a viewing angle in the liquid crystal display device illustrated in FIG. 6.

In this example, both of the alignment angle $\phi_{TFT}$ on the TFT side and the alignment angle $\phi_{CF}$ on the CF side are assumed to be equal to fifteen degrees, the effective retardation $R_{\it{eff}}$ is 0.3 $\mu$m, and absolute values of both the first and the second pretilt angels $\alpha$ and $\beta$ are equal to 4.5 degrees. The experimental results under the above-mentioned condition are shown in FIG. 9 and are shown in the form of a view cone which is known in the art. In FIG. 9, a contrast ratio (CR) equal to 50 is shown by curves which may be substantially circular.

As understood from FIG. 9, the illustrated view cone of this example is featured by the CR curves of 50 which are shaped in the circle, although the CR curves are not continuous but are disconnected partially. Specially, the CR curves show that a contrast of the first example has high values in the right-and-left and up-and-down directions of the panel. That is, the LCD device of this example has a good characteristic of the viewing angle.

Furthermore, the LCD device of this example has a good yield as compared with the conventional device because pretilt angles adjacent to the alignment films 130 and 230 are not smaller than two degrees and this serves to suppress an appearance of undesirable light point.

Figure 10:
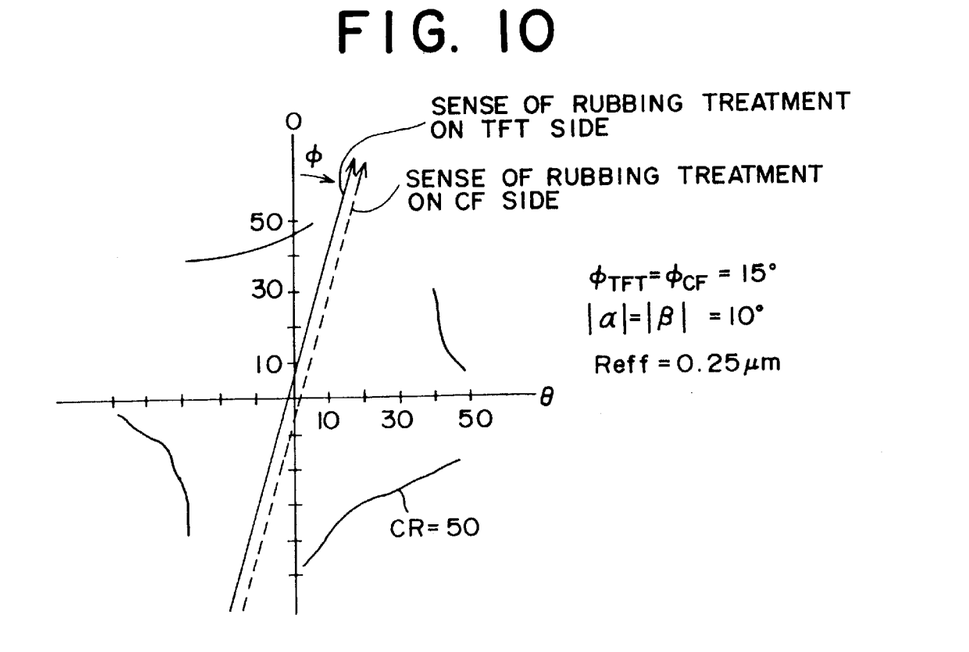
FIG. 10 is a view for use in describing a characteristic of a viewing angle in a liquid crystal display device according to a second example of this invention.

Referring to FIG. 10, another view cone according to the LCD device of a second example is depicted.

The LCD device of the second example has a same structure as the first example except for the following points. The effective retardation $R_{\it{eff}}$ is equal to 0.25$\mu$m and absolute values of both the first and the second pretilt angels $\alpha$ and $\beta$ are equal to 10 degrees. That is, in the LCD device of the second example, both of the alignment angles $\phi_{TFT}$ and $\phi_{CF}$ are equal to fifteen degrees. The experimental results under the above-mentioned condition are shown in FIG. 10 and are shown in the form of view cone. In FIG. 10, a contrast ratio (CR) equal to 50 is shown by curves which may be substantially circular, like in FIG. 9.

As understood from FIG. 10, the illustrated view cone of this example is featured by the CR curves of 50 which are shaped in the circle, although the CR curves are not continuous but are disconnected partially. Specially, the CR curves show that a contrast of the second example has high values in the right-and-left and up-and-down directions of the panel. That is, the LCD device of the second example has a good characteristic of viewing angle.

As well as the above-mentioned first example, the LCD device of the second example, furthermore, has a good yield as compared with the conventional device because pretilt angles adjacent to the alignment films 130 and 230 are not smaller than two degrees and this serves to suppress an appearance of undesirable light point.

As described above, the LCD devices according to this invention can obtain a good yield in comparison with the conventional device and a good characteristic of the viewing angle.

What is claimed is:

1. A liquid crystal display device comprising:

a first substrate having a first principal surface;

a first alignment film which is formed on said first principal surface and is subjected to a first aligning treatment;

a second substrate having a second principal surface;

a second alignment film which is formed on said second principal surface, said second alignment film oppositely disposed to said first alignment film with a predetermined space left between said first alignment film and said second alignment film, and said second alignment film subjected to a second aligning treatment in the same directional orientation as the first aligning treatment;

a liquid crystal layer formed by a plurality of liquid crystal molecules which are interposed and sealed between said first and said second alignment films, a part of said molecules adjacent to said first alignment film having a first pretilt angle falling within a first predetermined range which is not smaller than two degrees from said first alignment film due to the influence of said first aligning treatment, the other part of said molecules adjacent to said second alignment film having a second pretilt angle falling within a second predetermined range which is not smaller than two degrees from said second alignment film due to influence of said second aligning treatment; and field generating means for generating an electric field which is substantially parallel to said first and said second principal surfaces in said predetermined space to make said molecules rotate in accordance with said electric field.

2. A liquid crystal display device as claimed in claim 1, wherein said first and said second predetermined ranges are not smaller than three degrees from said first and said second alignment films, respectively.

3. A liquid crystal display device as claimed in claim 2, wherein said first and said second predetermined ranges are not greater than ten degrees from said first and said second alignment films, respectively.

4. A liquid crystal display device as claimed in claim 3, wherein said first and said second predetermined ranges are not greater than eight degrees from said first and said second alignment films, respectively.

5. A liquid crystal display device as claimed in claim 4, wherein said liquid crystal layer has an effective retardation between 0.2 $\mu$m and 0.36 $\mu$m, both inclusive, where the effective retardation is defined by integrating $\Delta n'(z)$ with respect to z from 0 to d, and where z is representative of a location between said first alignment film $z = 0$, and said second alignment film, wherein z takes maximum value d at the location of said second alignment, and $\Delta n'(z)$ is an effective refraction anisotropy which represents a refractive anisotropy at a location of z.

6. A liquid crystal display device as claimed in claim 5, wherein each of said molecules has a pretilt angle defined by said first pretilt angle, said second pretilt angle, and said location z of said molecules in question, and while said effective refraction anisotropy at the location z is determined by the pretilt angle of said molecule at the location z and both refractive indexes of long and short axes of said molecule at the location z.

7. A method of aligning treatment in a liquid crystal display device which comprises first and second substrates having first and second principal surfaces, respectively, first and second alignment films formed on said first and second principal surfaces, a liquid crystal layer formed by a plurality of liquid crystal molecules interposed and sealed between said first and said second alignment films, said device displaying an image by rotating axes of said molecules in a plane substantially parallel to both said first and second principal surfaces, said method of aligning treatment comprising steps of:

forming first and second unprocessed films on the first and second principal surfaces;

treating said first unprocessed film in a first aligning directional orientation to obtain said first alignment film so that said molecules adjacent to said first alignment film have a first pretilt angle falling within a first predetermined range which is not smaller than two degrees from said first alignment film;

treating said second unprocessed film in a second aligning directional orientation to obtain said second alignment film so that said molecules adjacent to said second alignment film have a second pretilt angle falling within a second predetermined range which is not smaller than two degrees from said second alignment film;

disposing said first and second alignment films oppositely each other with said first aligning directional orientation equal to said second aligning directional orientation.

8. A method of aligning treatment as claimed in claim 7, wherein said first and said second predetermined ranges are not smaller than three degrees from said first and said second alignment films, respectively.

9. A method of aligning treatment as claimed in claim 8, wherein said first and said second predetermined ranges are not greater than ten degrees from said first and said second alignment films, respectively.

10. A method of aligning treatment as claimed in claim 9, wherein said first and said second predetermined ranges are not greater than eight degrees from said first and said second alignment films, respectively.

* * * * *